US00RE36158E

United States Patent [19]

Forbes, Jr.

[11] E Patent Number: Re. 36,158

[45] Reissued Date of Patent: Mar. 23, 1999

[54] VENTING/OPENING FOR PAPERBOARD CARTON

[75] Inventor: Hampton E. Forbes, Jr., Edinburg, Va.

[73] Assignee: Westvaco Corporation, New York, N.Y.

[21] Appl. No.: 792,376

[22] Filed: Feb. 3, 1997

Related U.S. Patent Documents

Reissue of:

[64] Patent No.: 5,433,374
Issued: Jul. 18, 1995
Appl. No.: 68,074
Filed: May 28, 1993

U.S. Applications:

[63] Continuation of Ser. No. 925,745, Aug. 7, 1992, abandoned, which is a continuation-in-part of Ser. No. 831,991, Feb. 6, 1992, abandoned.

[51] Int. Cl.[6] ..... B65D 5/64; B65D 5/42

[52] U.S. Cl. ..... 229/125.35; 229/120; 229/123.2

[58] Field of Search ..... 229/123.1, 123.2, 229/125.35, 245, 160.2, 208; 220/270, 359; 206/531, 351, 354.2, 459.5

[56] References Cited

U.S. PATENT DOCUMENTS

| | | | |
|---|---|---|---|
| Re. 29,705 | 7/1978 | Compere | 206/531 |
| 3,809,221 | 5/1974 | Compere | 206/531 |
| 3,863,832 | 2/1975 | Gordon et al. . | |
| 4,091,930 | 5/1978 | Buchner et al. | 229/123.2 X |
| 4,183,458 | 1/1980 | Meyers | 229/123.2 |
| 4,304,352 | 12/1981 | Humphries | 229/125.35 X |
| 4,531,688 | 7/1985 | Forbes, Jr. . | |
| 4,871,071 | 10/1989 | Zimmermann | 229/125.35 X |
| 4,944,451 | 7/1990 | Forbes, Jr. | 229/125.35 X |
| 4,955,530 | 9/1990 | Rigby et al. . | |
| 5,090,615 | 2/1992 | Hopkins et al. | 229/125.35 |
| 5,244,145 | 9/1993 | Forbes, Jr. | 229/125.35 |

*Primary Examiner*—Stephen P. Garbe
*Attorney, Agent, or Firm*—Finnegan, Henderson, Farabow, Garrett & Dunner, L.L.P.

[57] ABSTRACT

A venting/opening means for an ovenable carton having a separate lid with venting and opening instructions printed on one corner, and a tray with a continuous peripheral flange. The improvement wherein the venting/opening means is applied to each corner of the tray flange for polygonal shaped cartons having side walls of equal length, or to designated diagonally opposed corners of trays of rectangular shape so as to provide a venting/opening means under the printed instructions on the lid notwithstanding how the lid is oriented on the tray. The venting/opening means takes the form of partial depth cut lines, cut score lines or the like arranged diagonally across the corners of the tray flange. These cut lines provide corner tabs which may be separated from the tray flange to allow the tray to be opened by fracturing the portion of the tray flange outboard of the cut lines and first partially lifting the lid to vent the carton, and then finally opening the carton by lifting the lid completely off the tray.

23 Claims, 4 Drawing Sheets

VENTING/OPENING FOR PAPERBOARD CARTON

Matter enclosed in heavy brackets [ ] appears in the original patent but forms no part of this reissue specification; matter printed in italics indicates the additions made by reissue.

This is a continuation of application Ser. No. 07/925,745, filed Aug. 7, 1992, now abandoned, which application is a continuation-in-part of U.S. application Ser. No. 07/831,991 filed Feb. 6, 1992, now abandoned, which is incorporated herein by reference.

BACKGROUND OF INVENTION

The present invention relates to ovenable cartons prepared from paperboard, and more particularly to a venting and opening means for such a carton. The invention is directed to tray type cartons, or cartons which include a tray with an upper, integral, peripheral flange and a separate lid which is adhered or heat sealed to the flange to close the carton. This invention is further related to applicant's prior U.S. Pat. No. 5,244,145, entitled "Two Way Opening for a Tray Type Carton", granted Sep. 14, 1993.

Cartons of the type disclosed herein are well known in the art. They are low in cost, disposable and adapted to be used in the preparation of food, particularly with the use of a microwave oven. Such cartons are preferably constructed from a thermally stable paperboard material that is generally referred to as ovenable paperboard. For this purpose, the paperboard is coated on at least one surface with a heat sealable thermoplastic material, for example, a polyester material such as polyethylene terephthalate (PET). The coating also serves to make the paperboard waterproof and provides a food contact surface. However, when such cartons are heat sealed, the bond between the lid and the peripheral flange of the tray is difficult to break. Thus a variety of opening and venting schemes have been proposed for such cartons.

The most fundamental of such opening means has been the simple use of a knife or other sharp object for cutting the lid. Many cartons include dotted lines printed on the lid surface indicating where the lid can be cut for venting and opening. This has not proven to be a satisfactory method and a number of alternative means have been developed, including, as shown in U.S. Pat. No. 3,863,832, a bond between the flange and the lid that is made heat sensitive for failure at a pre-selected temperature. In addition a variety of other opening schemes are shown in other prior art patents such as U.S. Pat. No. 4,091,930, where cuts are applied at each corner to define tabs that may be pulled for removing the adjacent strip of cover and flange; U.S. Pat. No. 4,183,458, where partial depth cut lines are applied to the lid or flange adjacent to the lid-to-flange bond area which permits delamination of the lid/flange when a corner of the lid is pulled away from the tray; U.S. Pat. No. 4,531,668, where partial depth cut lines (microcuts) are applied to the inner and outer surfaces of the lid at a location inboard of the lid-to-flange bond area for opening the carton; U.S. Pat. No. 4,871,071, where the venting and opening scheme is applied only to the lid at one corner; and U.S. Pat. No. 4,955,530, where the venting and opening scheme is also applied only to the lid at one corner. These prior art opening and venting means are each satisfactory to some extent but they fail to address the problem solved by the present invention.

SUMMARY OF INVENTION

The present invention is directed to a scheme for venting and opening a carton of the tray and lid type that does not involve any cuts in the lid itself for opening, that is reliable no matter how the lid is applied to the carton, that does not necessarily require microcuts in the lid which might weaken it, and that involves primarily a lifting action. For this purpose, the opening/venting means is initiated in the tray at one corner by applying partial depth cut lines or cut score lines only to the underside of the flange of the tray diagonally across the corner of the tray to provide corner tabs which may be separated from the tray flange for opening and venting of the tray. U.S. Pat. No. 4,183,458 discloses the use of such cut lines in a tray flange at one corner for initiating the opening of a combined lid and tray, but the arrangement disclosed therein only works as long as the lid is correctly placed on the tray. If one corner of the lid is marked "OPEN", but turned so that the marked corner ends up on a corner of the tray that is not pre-cut for opening, the consumer cannot readily open the carton without turning the carton upside down to locate the cuts. Even then it is unlikely that he or she would be successful.

In contrast to this, the carton of the present invention in its preferred embodiment is provided with a lid that has one corner marked with venting/opening directions and a separate tray with each corner provided with cut lines or the like to initiate the venting/opening scheme. In an alternative embodiment, specifically for trays and lids of rectangular shape, the cut lines need only be applied to a designated corner of the tray corresponding to the designated corner of the lid including the venting/opening instructions, and to the corner of the tray diagonally opposed from the designated corner. The alternative application of the invention for cartons of rectangular shape can be accomplished with only two venting/opening means at opposed diagonal corners of the tray if, during the manufacturing process, one of the venting/opening means is located at a designated corner corresponding to the designated corner of the lid where the venting/opening instructions are printed. The lids in such instance can only be placed on the tray in one of two ways, i.e., 180 degrees out-of-phase. Thus, the opportunities for mismatching using rectangular trays is less than where the carton has sidewalls of equal length. However, if there is no specific initial orientation of the designated corners of the lid and tray during the manufacturing process, even rectangular trays would preferably have the vending/opening cut lines at each of their four corners. This arrangement will insure that the corner of the lid marked with the venting and opening directions will always end up over a corner of the tray including the cut lines for initiating the venting/opening function.

DETAILED DESCRIPTION

Figure 1:
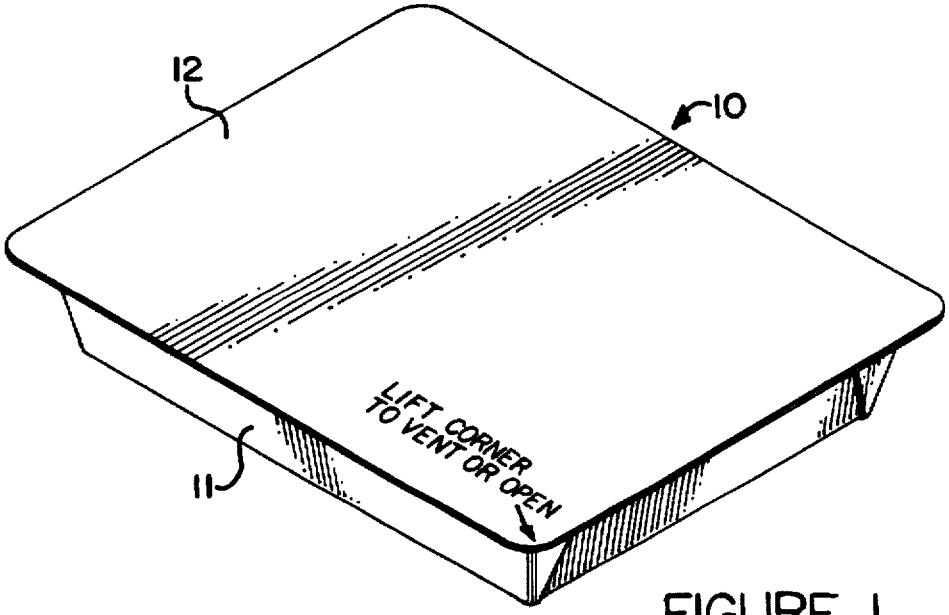
FIG. 1 is a perspective view of a tray type carton which embodies the principal features of the present invention.

Referring to the drawings, and more particularly to FIG. 1, there is illustrated a tray type carton 10 which is adapted for use in a microwave oven. The tray structure 11 is formed from a single sheet of flexible paperboard material which is coated with a heat resistant coating and which preferably has leakproof corners. Meanwhile the lid 12 is also formed from a single blank of flexible paperboard material which is coated with a heat resistant coating and which includes venting and opening directions printed on the outer surface of at least one corner. The tray structure includes an outwardly extending continuous upper peripheral flange 13 at the upper edges of the tray side walls and the lid is sized to fully cover the flange out to its marginal edges. Meanwhile the flange of the tray is provided with weakened cut/score lines 14, 15 applied to the underside of the flange at each corner of the tray to form the easy opening and venting means of the invention. The use of weakened cut/score lines, at each corner is required for polygonal cartons having side walls of equal length and may be desirable for cartons of rectangular shape. However, for rectangular cartons only, the weakened cut/score lines may be applied only to opposed designated corners and still achieve the same advantages of the present invention.

In most instances, the venting and opening instructions are only printed at one corner of the lid. If the venting/opening means is located in the lid as shown in the prior art, no problems arise. However when the venting and opening directions are only provided on one corner of the lid and the opening means is located only at one corner of the tray as shown in U.S. Pat. No. 4,183,458, it is mandatory that the lids and trays be matched up when the carton is filled to make sure that the venting/opening means in the tray is located under the corner of the lid with the printed instructions. Since such a match may not always be achieved on the filling line, the novelty of the present invention lies in providing a fail proof scheme for making sure that there will always be a venting/opening means beneath the corner of the lid containing the venting and opening instructions. This is accomplished in the present invention for a generally polygonal shaped carton having side walls of equal length, by applying weakened score lines in the lower surface of the flange at each corner of the tray. For rectangularly shaped cartons, the same result can be achieved by applying the cut lines to a designated corner of the tray corresponding to the designated corner of the lid including the venting/opening instructions, and to the corner of the tray diagonally opposed from the designated corner. For these carton configurations, a lid with venting and opening instructions printed on one corner will always end up over a corner of the tray with a venting/opening means notwithstanding the orientation of the lid with respect to the tray.

Figure 2:
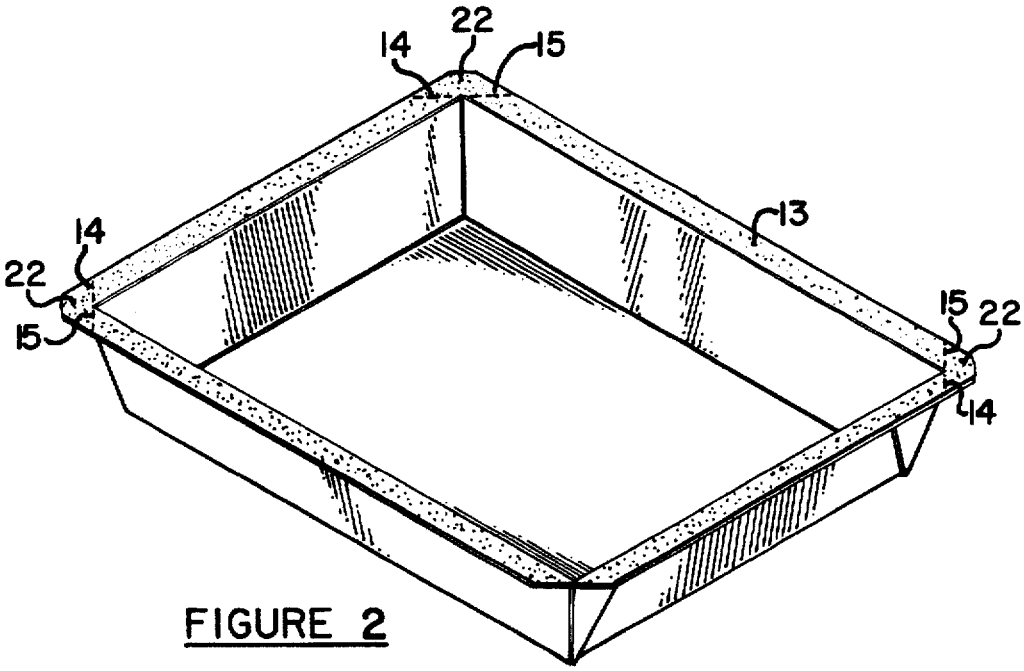
FIG. 2 is a perspective view of the carton of FIG. 1 with the lid removed; and, FIG. 3 is a top plan view of a typical lid for the carton of the present invention.

FIG. 2 illustrates the carton of FIG. 1 in its opened condition. One corner tab of the tray flange has been torn off and that corner tab remains attached to the lid. For venting, the corner is merely lifted slightly to open the carton only at the corner. When the lid is removed or partially removed, delamination between the lid and flange material may be accomplished in one of two ways. If it is desired for the flange to delaminate to the lid, cut/score lines or microcut lines are applied to the tray near or at the location of the fold lines 16, 17 connecting the tray flange 13 to the upper edges of the tray side and end walls 18, 19, 20, 21. If it is desired to delaminate the lid to the flange, cut/score lines or microcut lines are applied to the lid (not shown) at a location substantially coincident with a point which is opposite the innermost edge of the tray flange 13 where it is connected to the side and end walls 18, 19, 20, 21. These cut/score lines or microcut lines extend around the entire periphery of the flange or lid where it is desired to remove the lid entirely, or only around substantially the entire periphery where a portion of the lid remains attached to the tray.

Figure 3:
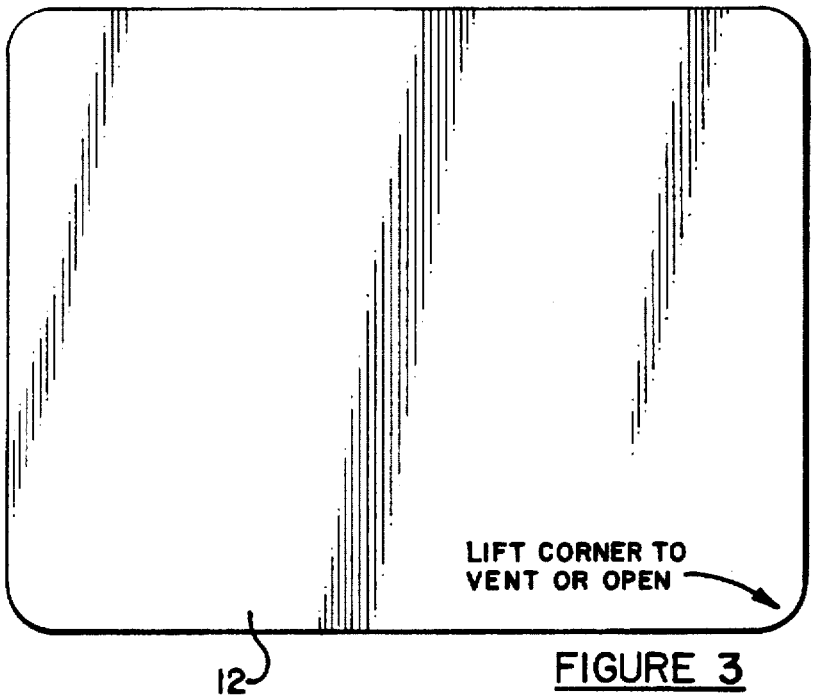
Figure 4:
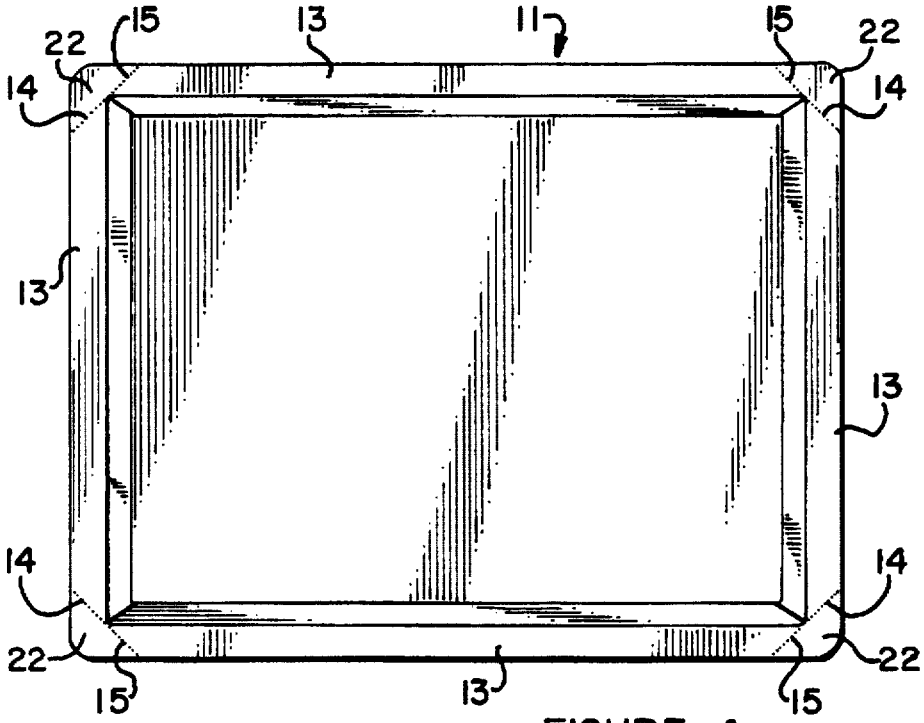
FIG. 4 is a top plan view of a typical tray for the carton of the present invention.
Figure 5:
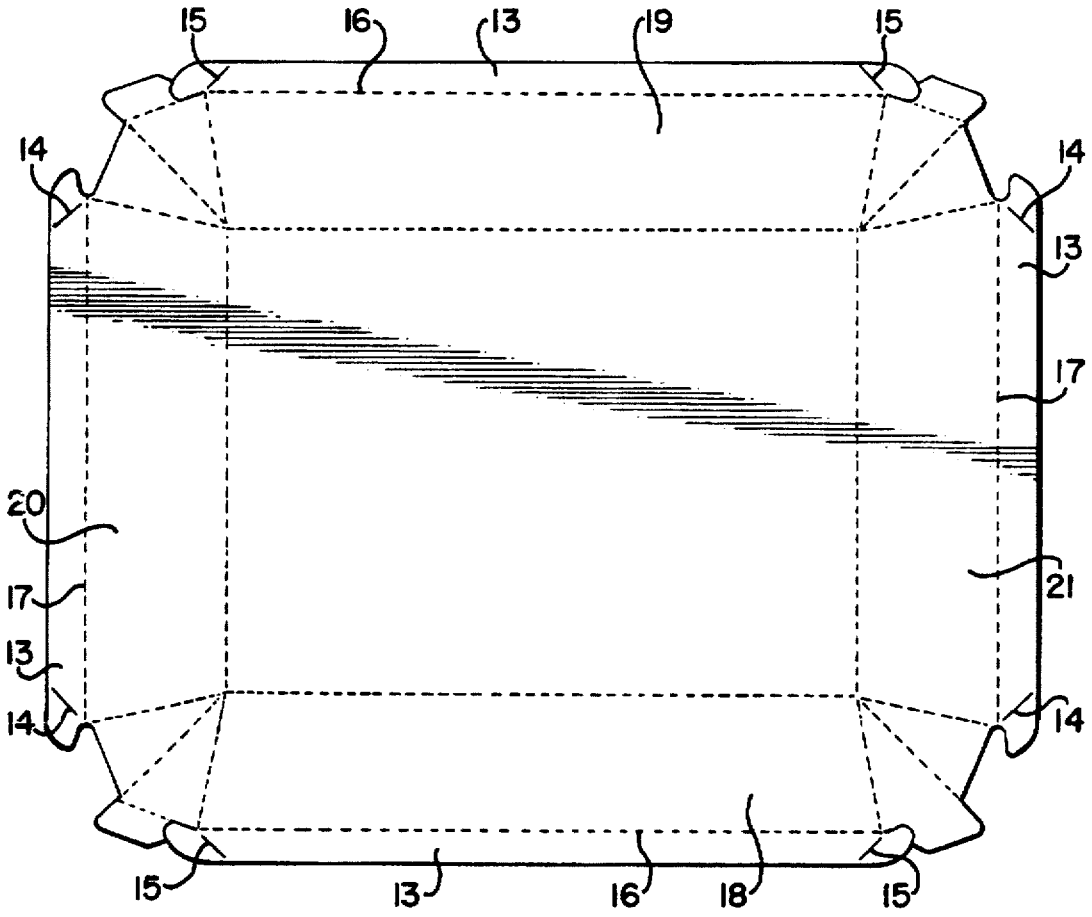
FIG. 5 is a [top] *bottom* plan view of a typical blank structure for forming the tray of the present invention.
Figure 6:
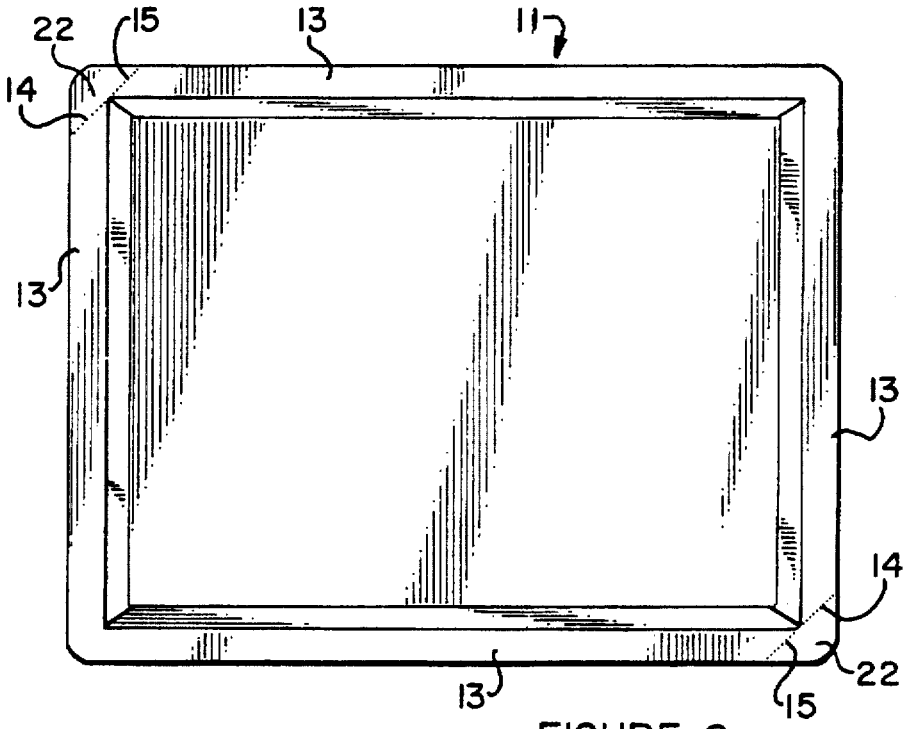
FIG. 6 is a top plan view of an alternative embodiment of the present invention for a tray of rectangular configuration only.

FIG. 3 illustrates a typical lid 12 for the carton of the present invention. For polygonal shaped cartons with equal length side walls or specifically, for rectangular shaped cartons where there is no prior manufacturing orientation between the lids and trays, the lid can have venting and opening instructions printed on one corner, no instructions at all, or general instructions to indicate that any corner may be vented or opened according to the present invention. This provides a versatility heretofore unavailable with cartons of the type described herein. A corresponding tray 11 is illustrated in FIG. 4 wherein each corner is provided with partial depth cut lines 14, 15 which define corner tabs 22 for initiating the venting/opening function and the blank for making such a tray is shown in FIG. 5. The preferred construction of the tray blank shown in FIG. 5 illustrates the flanges 13 with extensions which extends beyond the ends of side and end walls 18, 19, 20 and 21. When a tray is formed from the blank of FIG. 5, the flange extensions overlap one another and are bonded together. The cut/score lines 14, 15 are located diagonally in the flanges 13 inboard of the flange extensions. Unlike the prior art cartons with venting/opening schemes applied to the lid structure, the present invention provides a more reliable and desirable method for venting and opening such cartons by incorporating the venting/opening means in the tray. It will be appreciated that the present invention provides an improved venting/opening means for tray type cartons with separate lids and trays. Thus, even though only a preferred embodiment and one alternative of the invention is fully described herein, it is understood that the invention would apply to other structures within the scope of the claims appended hereto. For example, the claims should not be limited to the particular shape of the carton illustrated or to the tray style shown. The invention would apply to any carton having a tray with a continuous, peripheral flange. Moreover, the invention is intended to cover cartons where the lid is not completely removed, i.e., a portion or one side of the lid may remain attached to a flange after the carton is opened.

What is claimed is:

1. A paperboard container having a substantially polygonal shape with sides of equal length and distinct corners comprising, in combination, a tray having a bottom panel and upstanding side walls with upper edges, an outwardly extending flange connected to the upper edges of said side walls, and a separate lid including printed instructions only at one corner designating venting and opening directions and having marginal edge portions which overlie the flange and are adhered to the flange for closing the container, the improvement for venting and opening the container at the corner of the container located beneath the printed instructions notwithstanding how the lid is oriented on the tray comprising partial depth cut/score lines applied diagonally to the underside of the tray flange at each corner of the tray, said cut/score lines defining removable corner portions of the tray flange at each corner of the tray outboard from the cut/score lines, whereby only the portion of the flange located outboard from the cut/score lines located beneath the printed instructions on the lid need be removed from the flange for opening and venting the container.

2. A paperboard container as set forth in claim 1 wherein additional partial depth cut/score lines are applied to the tray substantially along the connection between the outwardly extending flange and the upper edges of the tray side walls, so that upon venting and opening the container, a portion of the tray flange outboard of the additional partial depth cut/score lines delaminates and remains attached to the lid when the container is opened.

3. A paperboard container as set forth in claim 1 wherein additional partial depth cut/score lines are applied to the underside of the lid in a region that is substantially coincident with the location of the connection between the outwardly extending flange of the tray and the upper edges of the side walls of the tray so that upon venting and opening of the container, a portion of the lid outboard of the additional partial depth cut/score lines delaminates and remains attached to the flange when the container is opened.

4. A paperboard container of generally rectangular shape prepared from a separate lid having marginal edge portions and a tray, each having a designated corner, said tray including a continuous upper flange and means for adhering the marginal edge portions of the lid to the tray flange, said lid including printed instructions for venting and opening of the container only at its designated corner, the improvement for venting and opening the container notwithstanding the orientation of the designated corners of the lid and tray comprising, partial depth cut/score lines applied diagonally to the underside of the tray flange at both its designated corner, corresponding to the designated corner of the lid, and at the corner of the tray flange diagonally opposed from its designated corner to define removable corner portions of the tray flange outboard from the cut/score lines at the two diagonally opposed corners of the tray, whereby only the removable corner portion of the flange located outboard from the cut/score lines beneath the designated corner of the lid need be removed for opening and venting the container.

5. A container comprising:

(a) a polygonal shaped flanged tray with sides of equal length and a plurality of corners;

(b) a separate lid bonded to the tray flange to close the container including instructions for opening and venting the container printed only on one corner; and (c) means for venting and opening the container notwithstanding how the lid is oriented on the tray comprising partial depth cut/score lines on the underside of the tray flange arranged diagonally across adjacent portions of the flange at each corner of the tray to define removable corner portions of the tray flange outboard from the cut/score lines at each corner of the tray whereby only the removable corner portion of the flange located beneath the printed instructions on the lid need be removed to open the container.

6. A container comprising:

(a) a rectangularly shaped flanged tray having a designated corner;

(b) a separate lid bonded to the tray flange having a designated corner including instructions for opening and venting the container printed only on its designated corner; and, (c) means for venting and opening the container notwithstanding the orientation of the designated corners of the lid and tray comprising partial depth cut/score lines on the underside of the tray flange arranged diagonally across adjacent portions of the tray flange at the designated corner and the corner of the tray flange diagonally opposed from its designated corner to define removable corner portions of the tray flange outboard from the cut/score lines at the designated corner and the corner of the tray flange diagonally opposed from the designated corner whereby only the removable corner portion of the flange located beneath the designated corner of the lid need be removed to open the container.

7. A tray having a plurality of corners comprising a bottom panel with a plurality of side edges, sidewall panels of substantially equal length foldably attached to the side edges of said bottom panel, gusset panels foldably attached to each sidewall panel and to each other at each corner of the tray, an outwardly extending flange foldably attached to each sidewall panel, said flanges each including end extensions which extend beyond the ends of each sidewall panel at each corner of the tray, where they are overlapped and bound together and means at each corner of the tray comprising partial depth cut/score lines applied diagonally across adjacent portions of the bonded flange extensions to provide removable corner portions of the tray flange outboard from the cut/score lines at each corner of the tray.

8. A tray blank having a plurality of corners comprising a bottom panel having a plurality of side edges of substantially equal length, a sidewall panel foldably attached to each edge of said bottom panel, gusset panels foldably attached to one another and to adjacent ends of the sidewall panels, flanges foldably attached to each side wall panel, said flanges each including end extensions which extend beyond the ends of each sidewall panel at each corner of the blank, and means comprising partial depth cut/score lines located inboard of a flange extension applied diagonally across each end of each flange at each corner of the blank to provide removable corner portions of the tray flange outboard from the cut/score lines.

*9. A tray having a plurality of corners comprising a bottom panel with a plurality of side edges, sidewall panels foldably attached to the side edges of said bottom panel, gusset panels foldably attached to each sidewall panel and to each other at each corner of the tray, an outwardly extending flange foldably attached to each sidewall panel, a flange extension at each end of each flange, adjacent flange extensions being overlapped and bound together at each corner of the tray, and a partial depth cut/score line applied diagonally across the bonded flange extensions at each corner to provide removable corner portions of the tray flange outboard from the cut/score lines at each corner of the tray.*

*10. The tray of claim 9 wherein the bottom panel is a rectangle.*

*11. The tray of claim 9 wherein the bottom panel is a square.*

*12. A tray having a plurality of corners comprising a bottom panel with a plurality of side edges, sidewall panels foldably attached to the side edges of said bottom panel, gusset panels foldably attached to each sidewall panel and to each other at each corner of the tray, an outwardly extending flange foldably attached to each sidewall panel, a flange extension at each end of each flange, adjacent flange extensions being overlapped and bound together at each corner of the tray, and a partial depth cut/score line applied diagonally across the bonded flange extensions at two diagonally opposite corners to provide removable corner portions of the tray flange outboard from the cut/score lines at the two diagonally opposite corners of the tray.*

*13. The tray of claim 12 wherein the bottom panel is a rectangle.*

*14. The tray of claim 12 wherein the bottom panel is a square.*

*15. A tray blank having a plurality of corners comprising a bottom panel having a plurality of side edges, a sidewall panel foldably attached to each edge of said bottom panel, gusset panels foldably attached to one another and to adjacent ends of the sidewall panels, flanges foldably attached to each side wall panel, said flanges each including*

*end extensions which extend beyond the ends of each sidewall panel at each corner of the blank, and a partial depth cut/score line extending diagonally in a flange proximate the respective extension at each corner of the blank to provide in the tray when assembled removable corner portions of the flange outboard from the cut/score lines.*

*16. A tray blank comprising a bottom panel having a plurality of edges, a sidewall panel foldably attached to each edge of the bottom panel, gusset panels foldably joining adjacent ends of the sidewall panels, a flange foldably attached to each side wall panel opposite the respective bottom panel edge, each flange including an extension proximate the respective gusset panel, the extensions being disposed to join adjacent flanges and define flange corners in the assembled tray, and a partial depth cut/score line extending diagonally across a flange inboard of a respective flange extension at two diagonally opposite corners of the assembled tray to define removable corner portions of the tray flange outboard from the cut/score lines.*

*17. A tray blank having upper and lower surfaces and comprising a bottom panel having a plurality of edges, a sidewall panel foldably attached to each edge of the bottom panel, gusset panels foldably joining adjacent ends of the sidewall panels, a flange foldably attached to each side wall panel opposite the respective bottom panel edge, each flange including an extension proximate the respective gusset panels, the extensions being disposed to join adjacent flanges and define flange corners in the assembled tray, and a partial depth cut/score line extending diagonally in the lower surface of each flange to define at the flange corners of the assembled tray a removable corner portion of the tray flange outboard from the cut/score lines.*

*18. In a tray including a bottom panel, sidewalls upwardly extending from the periphery of the bottom panel, gusset panels connecting adjacent sidewalls to define corners of the tray, and flanges outwardly extending from the sidewalls at distal edges thereof, the improvement comprising flange extensions extending from the ends of each flange and being joined to adjacent flange extensions to define flange corners at each tray corner and a partial depth cut/score line at each flange corner to define removable corner tabs.*

*19. The tray of claim 18 wherein the bottom panel is a square.*

*20. The tray of claim 18 wherein the bottom panel is a rectangle.*

*21. In a tray including a bottom panel, sidewalls upwardly extending from the periphery of the bottom panel, gusset panels connecting adjacent sidewalls to define corners of the tray, and flanges outwardly extending from the sidewalls at distal edges thereof, the improvement comprising flange extensions extending from the ends of each flange and being joined to adjacent flange extensions to define flange corners at each tray corner and a partial depth cut/score line at diagonally opposite flange corners to define at least two removable corner tabs.*

*22. The tray of claim 21 wherein the bottom panel is a square.*

*23. The tray of claim 21 wherein the bottom panel is a rectangle.*

* * * * *